(No Model.)

W. FRIEND.
RUBBER ERASER.

No. 376,081. Patented Jan. 10, 1888.

WITNESSES:
E. J. Griswold.
Henry Clay Fish.

INVENTOR
William Friend
BY Frederick M. Crosby

UNITED STATES PATENT OFFICE.

WILLIAM FRIEND, OF NEW YORK, N. Y.

RUBBER ERASER.

SPECIFICATION forming part of Letters Patent No. 376,081, dated January 10, 1883.

Application filed November 7, 1887. Serial No. 254,460. (No model.)

*To all whom it may concern:*

Be it known that I, WILLIAM FRIEND, a citizen of the United States, residing in the city of New York, county and State of New York, have invented a new and useful Improvement in Rubber Erasers, of which the following is a specification.

My invention relates to rubber erasers used for erasing lead-pencil or ink marks from paper or other surfaces; and its object is to so construct the eraser that it can be used in a closely-written page or drawing without defacing or erasing the adjoining words, figures, or other marks, and when not in use to protect its edge, by means of its flanged circular center piece, from coming in contact with dust or dirt.

It consists of a rubber ring sprung in a groove in the edge of a center piece of wood or other suitable material, said ring being beveled in such manner as to give its periphery a sharp edge.

Figure 4:
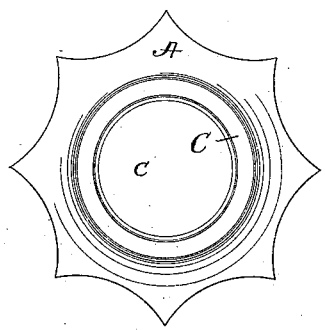
Figure 1:
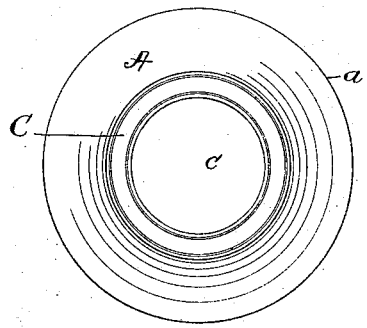
Figure 2:
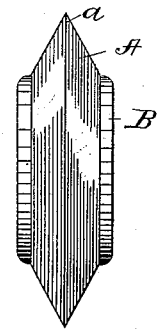
Figure 3:
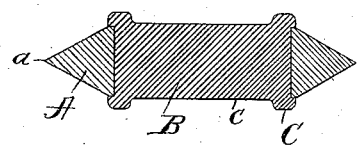

In the accompanying drawings, Figure 1 is a plan view of my improved device. Fig. 2 is an edge view. Fig. 3 is a sectional view showing the manner of attaching the ring to the center piece, and Fig. 4 is a modification showing the periphery of the eraser provided with sharp points.

A is a rubber ring beveled to a sharp edge, $a$, Fig. 2.

B is the center piece, having a groove, $b$, in which is sprung the rubber ring A, Fig. 3, and C is a flange raised upon the outer edge of the face $c$, Fig. 1, to which may be attached a calendar or other printed matter.

It will be readily seen that this construction presents advantages not before attained—such as the erasing of words, characters, or lines in a closely-written page or drawing without defacing or erasing the adjoining words or lines, preventing the rubber from becoming soiled by coming in contact with dust or dirt, and enabling it to be used for a longer period than any now known to the trade, by reason of its increased erasing-surface.

I claim as my invention—

1. A rubber eraser consisting of a rubber ring sprung in a groove on the outer edge of a circular center piece, said ring being beveled in such a manner as to give its periphery a sharp edge, substantially as shown and described.

2. In a rubber eraser, the combination of the rubber ring A, edge $a$, circular center piece B, groove $b$, flange C, and face $c$, substantially as shown and described.

WILLIAM FRIEND.

Witnesses:
 W. C. BAIRD,
 HENRY CLAY FISH.